(12) United States Patent
Ku

(10) Patent No.: US 9,398,134 B2
(45) Date of Patent: Jul. 19, 2016

(54) ELECTRONIC DEVICE AND METHOD FOR ADJUSTING AMOUNT OF ELECTRIC POWER SUPPLIED TO PROXIMITY SENSOR OF THE ELECTRONIC DEVICE

(71) Applicant: FIH (Hong Kong) Limited, Kowloon (HK)

(72) Inventor: Kao-Hua Ku, New Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 402 days.

(21) Appl. No.: 14/083,473

(22) Filed: Nov. 19, 2013

(65) Prior Publication Data

US 2014/0152121 A1 Jun. 5, 2014

(30) Foreign Application Priority Data

Dec. 3, 2012 (TW) .............................. 101145307 A

(51) Int. Cl.
*H04M 1/725* (2006.01)
*G05B 13/00* (2006.01)
*H04M 1/67* (2006.01)

(52) U.S. Cl.
CPC ............ *H04M 1/72519* (2013.01); *H04M 1/67* (2013.01); *H04M 2250/12* (2013.01); *H04M 2250/22* (2013.01); *Y10T 307/766* (2015.04)

(58) Field of Classification Search
CPC ........................................................ G05B 13/00
USPC ......................................................... 307/116
See application file for complete search history.

(56) References Cited

U.S. PATENT DOCUMENTS

2013/0172045 A1* 7/2013 Caballero ............ H04B 1/3838
455/552.1

\* cited by examiner

*Primary Examiner* — Robert Deberadinis
(74) *Attorney, Agent, or Firm* — ScienBiziP, P.C.

(57) ABSTRACT

An electronic device includes a touch screen, a background light, and a proximity sensor. The electronic device sets a default value for an amount of electric power supplied to the proximity sensor and a rule for adjusting the amount of electric power supplied to the proximity sensor. When a calling function of the electronic device is started, the electronic device is enabled to supply the proximity sensor the amount of electric power having the default value, and determines if the proximity sensor detects an object near the touch screen with the amount of electric power having the default value. The electronic device increases or decreases the amount of electric power supplied to the proximity sensor according to the rule.

12 Claims, 3 Drawing Sheets

ELECTRONIC DEVICE AND METHOD FOR ADJUSTING AMOUNT OF ELECTRIC POWER SUPPLIED TO PROXIMITY SENSOR OF THE ELECTRONIC DEVICE

BACKGROUND

1. Technical Field

Embodiments of the present disclosure relate to power adjustment systems and methods, and more particularly to an electronic device and a method for adjusting electric power supplied to a proximity sensor of the electronic device.

2. Description of Related Art

Proximity sensors of electronic devices (e.g., mobile phones) are used to detect facial proximity between users and the electronic device. When a proximity sensor of an electronic device detects that a distance between a user, or the face of a user, and a touch screen of the electronic device falls within a preset range, the electronic device automatically turns off a background light of the electronic device and locks the touch screen. When the distance falls outside the preset range, the electronic device automatically turns on the background light and unlocks the touch screen. At present, the amount of electric power supplied to a proximity sensor is fixed at one level, which does not save power of the electronic device.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
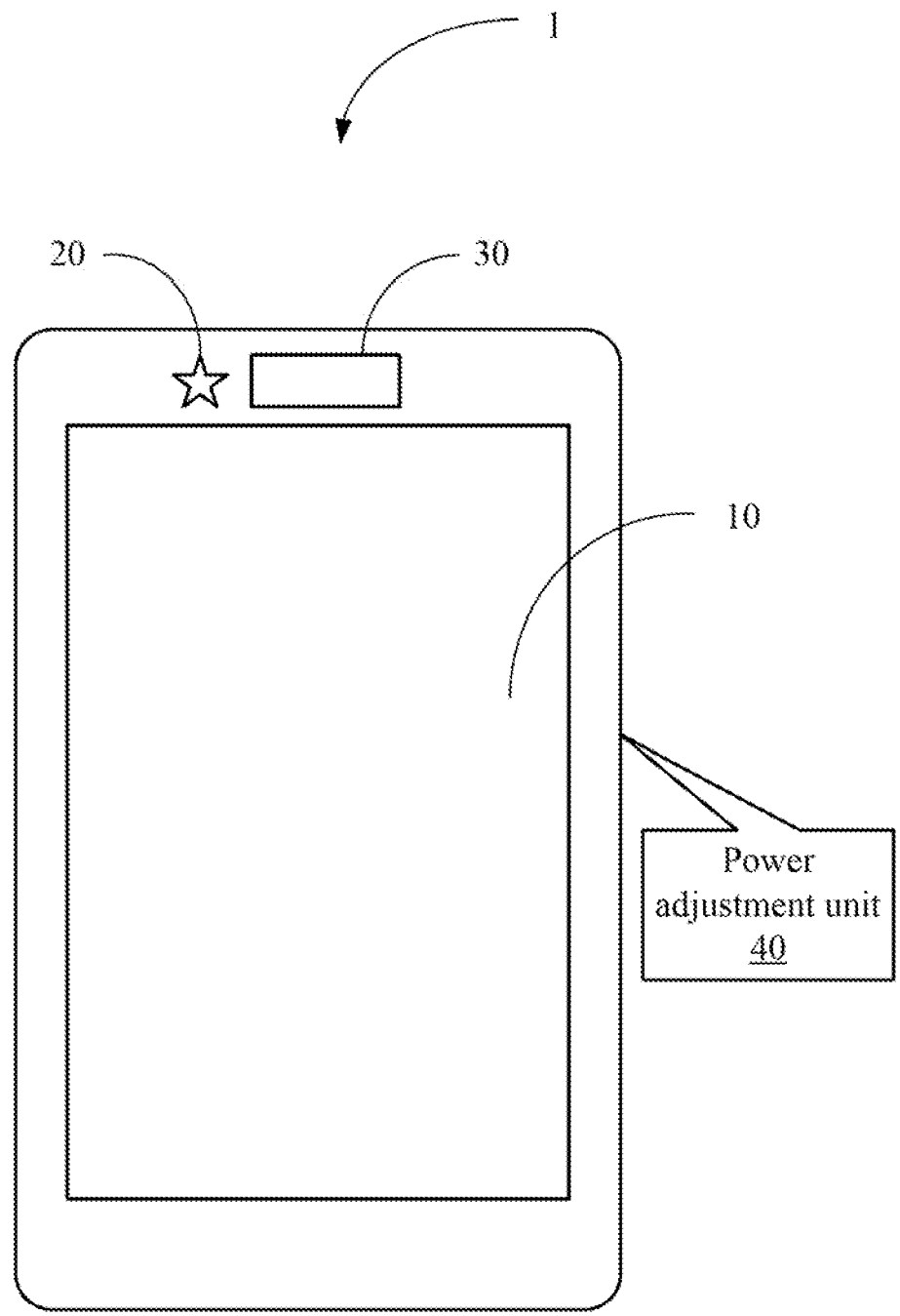
FIG. 1 is a block diagram of one embodiment of an electronic device including a power adjustment unit.

FIG. 1 is a block diagram of one embodiment of an electronic device 1. The electronic device 1 includes a touch screen 10, a proximity sensor 20, a headphone 30, and a power adjustment unit 40. The electronic device 1 may be a mobile telephone or any other electronic device having a function of enabling telephone calls out (calling function). As shown in FIG. 1, the proximity sensor 20 is installed on the left of the headphone 30. In other embodiments, the proximity sensor 20 may be positioned on the right side or within a groove of the headphone 30. The proximity sensor 20 may be an optimal displacement sensor, a linear proximity sensor, or an ultrasonic wave proximity sensor.

In one embodiment, when the calling function of the electronic device 1 is started by a user of the electronic device 1, the proximity sensor 20 is activated with an amount of electric power. If the proximity sensor 20 detects an object at the amount of electric power, the power adjustment unit 40 decreases the amount of electric power supplied to the proximity sensor 20. If the proximity sensor 20 does not detect an object with the amount of electric power, the power adjustment unit 40 increases the amount of electric power supplied to the proximity sensor 20 to broaden a detection range of the proximity sensor 20.

Figure 2:
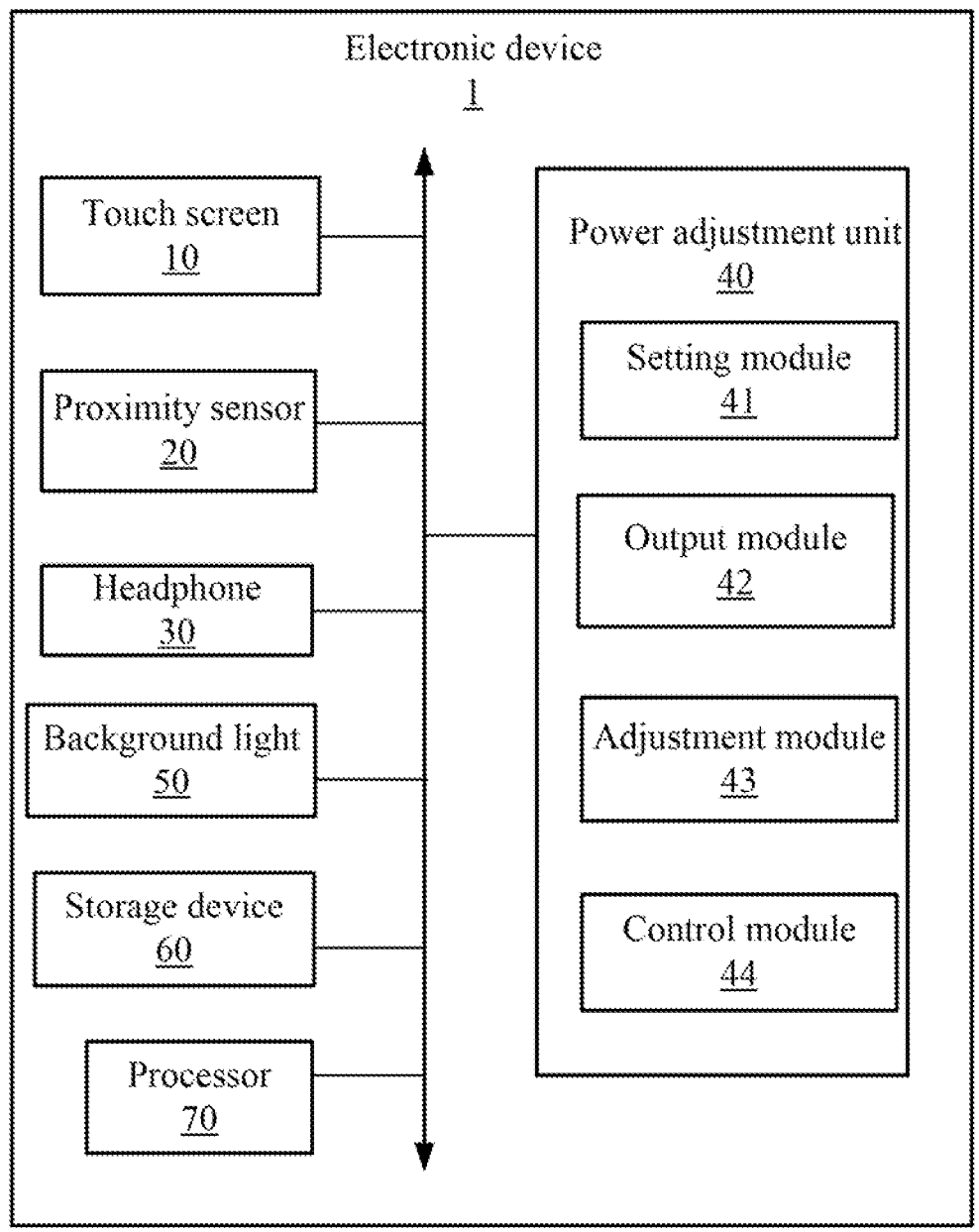
FIG. 2 is one embodiment of one embodiment of function modules of the power adjustment unit of FIG. 1.

As shown in FIG. 2, the electronic device 1 further includes a background light 50, a storage device 60, and a processor 70. The electronic device 1 may further include components that are not shown in FIG. 1, such as a keyboard and a camera, for example. The storage device 60 is a dedicated memory, such as an EPROM, a hard disk drives (HDD), or a flash memory. The power adjustment unit 40 includes a setting module 41, an output module 42, an adjustment module 43, and a control module 44. The modules 41-44 include computerized code in the form of one or more programs that are stored in the storage device 60. The processor 70 executes the computerized code to provide the functions of the power adjustment unit 40 as described above. Detailed functions of the modules 41-44 are given in reference to FIG. 3.

Figure 3:
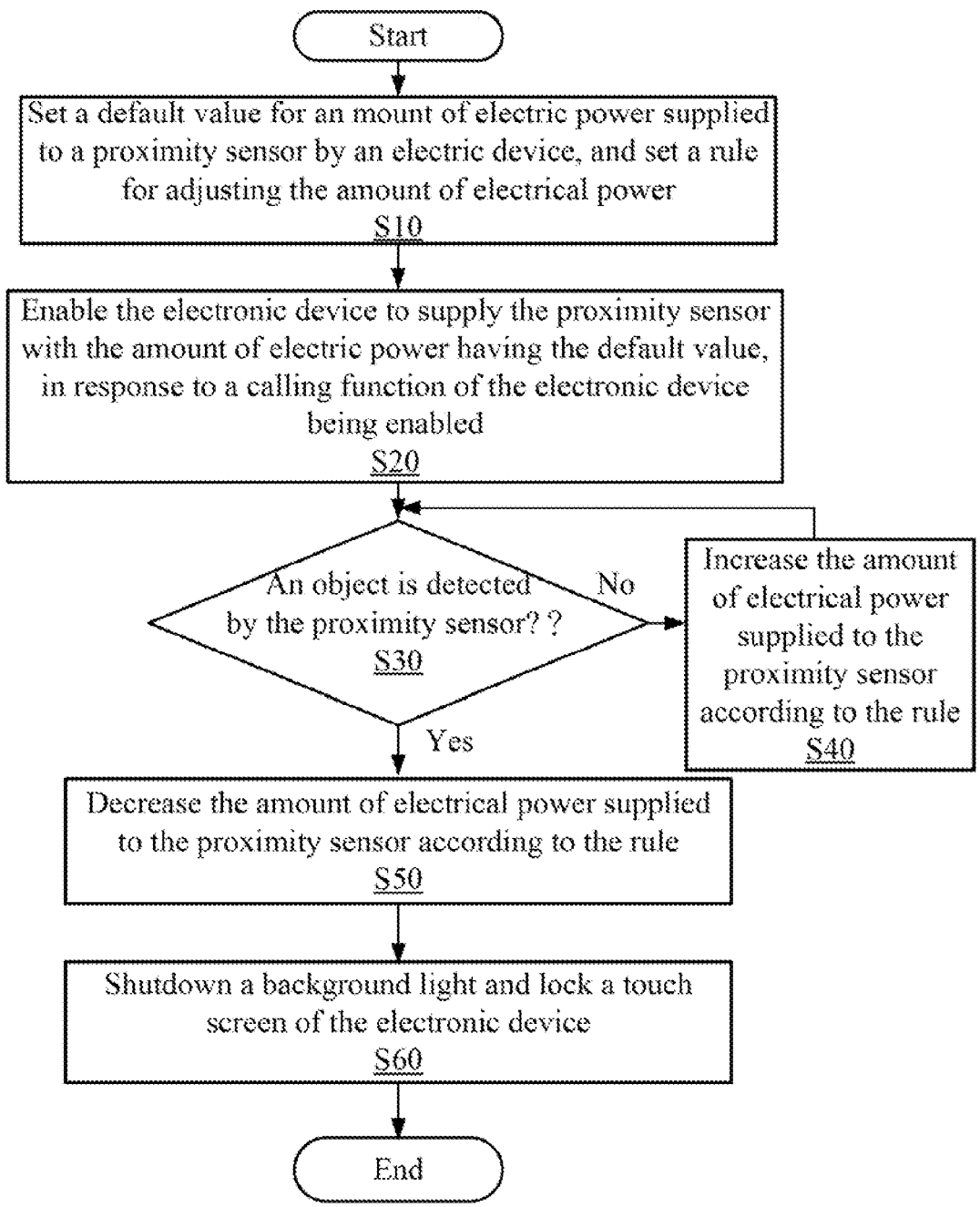
FIG. 3 is one embodiment of a flowchart of a method of adjusting an amount of electric power supplied to a proximity sensor by the electronic device of FIG. 1.

FIG. 3 is one embodiment of a flowchart of a method of adjusting an amount of electric power supplied to the proximity sensor 20 by the electronic device 1 of FIG. 1. Depending on the embodiment, additional steps may be added, others removed, or the ordering of the steps may be changed.

In step S10, the setting module 41 sets a default value for an amount of electric power supplied to the proximity sensor 20 by the electronic device 1 and a rule for adjusting the amount of electric power supplied to the proximity sensor 20. The power consumption of the proximity sensor 20 has a minimum value (such as zero watts) and a maximum value (such as 10w), and the default value for the amount of electric power supplied to the proximity sensor 20 may be set between the minimum value and the maximum value. The higher the amount of electric power supplied, the greater a detection range of the proximity sensor 20. The rule for adjusting the electric power supplied to the proximity sensor 20 may be set as power level increments or decrements of (i.e., increasing or decreasing) the amount of electric power supplied to the proximity sensor 20 by a preset value (such as 2w). The setting module 41 stores the set information into the storage device 60.

In step S20, when a calling function of the electronic device is started, the output module 42 enables the electronic device 1 to supply the proximity sensor 20 the electric power having the default value (such as 6w).

In step S30, the adjustment module 43 determines if the proximity sensor 20 detects an object near to the touch screen 10 with the amount of electric power having the default value. If no object is detected with the amount of electric power having the default value, step S40 is implemented, the adjustment module 43 increases the amount of electric power supplied to the proximity sensor 20 according to the rule. For example, the adjustment module 43 increases the preset value (such as 2w) to the amount of electric power (such as 6w) supplied to the proximity sensor 20, and then the amount of electric power supplied to the proximity sensor 20 by the electronic device 1 is adjusted to 8w, for example. The procedure then returns to step S30.

In step S30, if the adjustment module 43 determines that the proximity sensor 20 detects an object near to the touch screen 10 with the amount of electric power having the default value, step S50 is implemented, the adjustment module 43 decreases the amount of electric power supplied to the proximity sensor 20 according to the rule. For example, the adjustment module 43 deducts the preset value (such as 2w) from the amount of electric power supplied to the proximity sensor 20, and then the proximity sensor 20 receives the electric power of 4w.

In step S60, the control module 44 shuts down the background light 50 and locks the touch screen 10.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A method for adjusting an amount of electric power supplied to a proximity sensor by an electronic device, comprising:
    setting a default value for an amount of electric power supplied to the proximity sensor and a rule for adjusting the amount of electric power supplied to the proximity sensor;
    enabling the electronic device to supply the proximity sensor with the electric power having the default value, in response to a calling function of the electronic device being enabled;
    determining if the proximity sensor detects an object near a touch screen of the electronic device with the amount of electric power having the default value;
    increasing the amount of electric power supplied to the proximity sensor according to the rule in response to determining that the proximity sensor detects no object with the amount of electric power having the default value, or decreasing the amount of electric power supplied to the proximity sensor according to the rule in response to determining that the proximity sensor detects an object with the amount of electric power having the default value.

2. The method as claimed in claim 1, further comprising: shutting down a background light of the electronic device and locking the touch screen in response to determining that the proximity sensor detects an object with the amount of electric power having the default value.

3. The method as claimed in claim 1, wherein the rule is set as adjusting the amount of electric power supplied to the proximity sensor by a preset value.

4. The method as claimed in claim 1, wherein the electric power supplied to the proximity sensor has a minimum value and a maximum value, and the default value is set between the minimum value and the maximum value.

5. An electronic device, comprising:
    a touch screen;
    a background light;
    a proximity sensor;
    a processor;
    a storage device that stores one or more programs, when executed by the processor, causing the processor to perform operations:
    setting a default value for an amount of electric power supplied to the proximity sensor and a rule for adjusting the amount of electric power supplied to the proximity sensor;
    enabling the electronic device to supply the proximity sensor with the amount of electric power having the default value, in response to a calling function of the electronic device being enabled;
    determining if the proximity sensor detects an object near the touch screen with the amount of electric power having the default value;
    increasing the amount of electric power supplied to the proximity sensor according to the rule in response to determining that the proximity sensor detects no object with the amount of electric power having the default value, or decreasing the amount of electric power supplied to the proximity sensor according to the rule in response to determining that the proximity sensor detects an object with the amount of electric power having the default value.

6. The electronic device as claimed in claim 5, wherein the operations further comprise: shutting down a background light of the electronic device and locking the touch screen in response to determining that the proximity sensor detects an object with the amount of electric power having the default value.

7. The electronic device as claimed in claim 5, wherein the rule is set as adjusting the amount of electric power supplied to the proximity sensor by a preset value.

8. The electronic device as claimed in claim 5, wherein the electric power supplied to the proximity sensor has a minimum value and a maximum value, and the default value is set between the minimum value and the maximum value.

9. A non-transitory computer-readable medium having stored thereon instructions that, when executed by a processor of an electronic device, causing the processor to perform operations:
    setting a default value for an amount of electric power supplied to the proximity sensor and a rule for adjusting the amount of electric power supplied to the proximity sensor;
    enabling the electronic device to supply the proximity sensor with the electric power having the default value, in response to a calling function of the electronic device being enabled;
    determining if the proximity sensor detects an object near a touch screen of the electronic device with the amount of electric power having the default value;
    increasing the amount of electric power supplied to the proximity sensor according to the rule in response to determining that the proximity sensor detects no object with the amount of electric power having the default value, or decreasing the amount of electric power supplied to the proximity sensor according to the rule in response to determining that the proximity sensor detects an object with the amount of electric power having the default value.

10. The medium as claimed in claim 9, wherein the operations further comprise: shutting down a background light of the electronic device and locking the touch screen in response to determining that the proximity sensor detects an object with the amount of electric power having the default value.

11. The medium as claimed in claim 9, wherein the rule is set as adjusting the amount of electric power supplied to the proximity sensor by a preset value.

12. The medium as claimed in claim 9, wherein the electric power supplied to the proximity sensor has a minimum value and a maximum value, and the default value is set between the minimum value and the maximum value.

* * * * *